Nov. 4, 1924.  1,514,172
M. U. RAMSAY ET AL
WORM HOB FOR GEAR CUTTING
Filed April 18, 1922
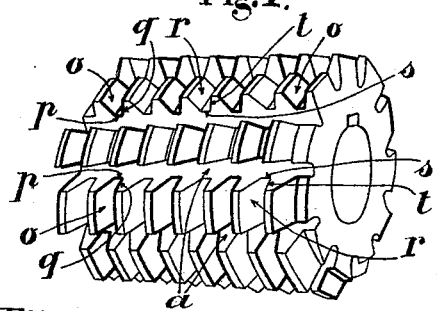
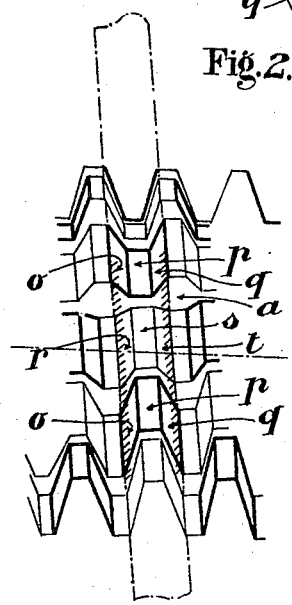
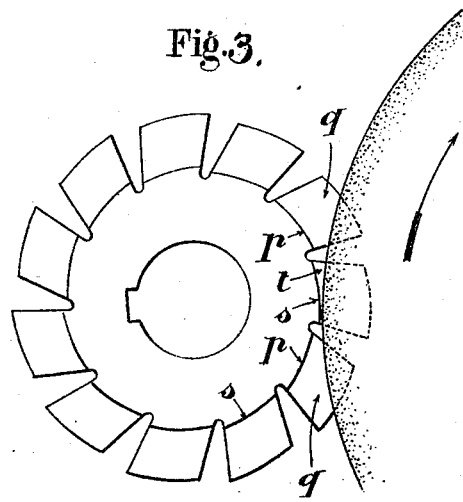

Patented Nov. 4, 1924.

1,514,172

UNITED STATES PATENT OFFICE.

MARCEL ULYSSE RAMSAY AND DÉSIRÉ MARIE MOEGLEN, OF BOIS-COLOMBES, FRANCE.

WORM HOB FOR GEAR CUTTING.

Application filed April 18, 1922. Serial No. 555,293.

*To all whom it may concern:*

Be it known that we, MARCEL ULYSSE RAMSAY and DÉSIRÉ MARIE MOEGLEN, respectively citizens of the Swiss Republic and of the French Republic, residing at Bois-Colombes, Seine, in the Republic of France, have invented new and useful Improvements in Worm Hobs for Gear Cutting, of which the following is a specification.

This invention relates to a worm hob for gear cutting designed in such manner as to permit the use of a grinding wheel of large diameter for grinding the profile of each tooth without altering the cutting parts of the adjacent teeth. The use of a grinding wheel of large diameter has the advantage of preserving for a long time the exact outline of said wheel and of working at a slow speed of rotation.

In the accompanying drawing which shows by way of example a form of construction of the invention:

Fig. 1 shows in perspective a worm hob according to the invention.

Fig. 2 is a partial lateral view showing the operation for the relieving of the said worm hob.

Fig. 3 shows a grinding wheel of large diameter engaged between the two surfaces to be ground after thermic treatment.

As shown in the drawing, the operation for the relieving of the worm hob for gear cutting which is the object of the invention, carried out before the thermic treatment, is effected by the methods generally employed, but in such manner that the surfaces $o, p, q$ shown in heavy lines in Figs. 1 and 2 shall be ground to a greater depth than the surfaces $r, s, t$ in fine lines which will be used alone for forming the cutting edges after the final grinding operation.

Longitudinal grooves $a$ are formed as usual for the disengagement of the chip and used at the same time to form with the thread or threads of the worm hob the cutting edges of the tool. It will be seen that in a row of teeth between two grooves $a$, the said surfaces $o, p, q$, which comprise the bottom $p$ of the recess between two adjacent teeth and the two adjacent sides $o, q$ of said teeth, alternate with the said surfaces $r, s, t$ which comprise also the bottom face $s$ between two teeth and the adjacent sides $r, t$ of said teeth. The grooves $a$ are in an odd number (11 in the example represented), this having the effect of placing each space $r, s, t$ between two deeper spaces $o, p, q$, along the helical pitch line of the screwthread, as shown in Fig. 2.

By means of the above construction, it is possible to finally grind the surfaces $r, s, t,$ after the thermic treatment with a grinding wheel having a large diameter as shown in Fig. 3 without the risk of the wheel coming into contact with the side faces $o, q$ of the adjacent teeth, since said side faces have been ground to a greater depth in the preliminary grinding effected before tempering.

By the above method of manufacture, a worm hob will finally be obtained which possesses along the screwthread of the tool a succession of cutting teeth operating alternately on the right (at the face $t$) and on the left (at the face $r$). This disposition has the advantage of facilitating the disengagement of the chips and does not prevent their unwinding during the action of the worm hob.

It also permits of finally grinding, in the same operation, with the side faces $r, t$ of the teeth, as above described, the intermediate bottom face $s$. By this means, the edge of said bottom face $s$ may be used as a cutting part in order to retouch, when cutting a gear wheel, the external diameter of the latter which has been previously turned with an excess of a few tenths of a millimetre on the diameter.

In this manner, the bore which serves for the centering of the gear can be subsequently rectified concentrically with the external periphery retouched by the worm hob.

Having now described our invention, what we claim as new and desire to secure by Letters Patent is:

1. A worm hob for gear cutting comprising a core having a screwthread formed thereon, an odd number of longitudinal grooves being cut through the screwthread, in order to divide the same into longitudinal rows of teeth, every second recess between two adjacent teeth in each row having its side walls ground to the exact dimension required and the other alternating recesses in the row having their side walls ground to a greater depth than that corresponding to said dimension.

2. A worm hob for gear cutting comprising a core having a screwthread formed thereon, an odd number of longitudinal grooves being cut through the screwthread in order to divide the same into longitudinal rows of teeth, every second recess between two adjacent teeth in each row having its bottom wall and side walls ground to the exact dimension required and the other alternating recesses in the row having their side walls ground to a greater depth than that corresponding to said dimension.

3. A worm hob for gear cutting comprising a core having a screwthread formed thereon, an odd number of longitudinal grooves being cut through the screwthread in order to divide the same into longitudinal rows of teeth, every second recess between two adjacent teeth in each row having its bottom wall and side walls ground to the exact dimension required and the other alternating recesses in the row having their bottom wall and side walls ground to a greater depth than that corresponding to said dimension.

In testimony whereof we have signed our names to this specification.

MARCEL ULYSSE RAMSAY.
DÉSIRÉ MARIE MOEGLEN.